US012719061B2

(12) United States Patent
Di Noto et al.

(10) Patent No.: US 12,719,061 B2
(45) Date of Patent: Aug. 25, 2026

(54) GRAPHENE AND OTHER 2D MATERIALS AS LAYERED "SHELLS" SUPPORTED ON "CORE" NANOPARTICLE CARRIERS

(71) Applicant: BRETON S.P.A., Castello di Godego (IT)

(72) Inventors: Vito Di Noto, Cadoneghe (IT); Enrico Negro, Camposampiero (IT); Antoine Bach Delpeuch, St-Thibault-des-Vignes (FR); Federico Bertasi, Bardolino (IT); Gioele Pagot, Santa Lucia di Piave (IT); Keti Vezzu', Rovolon (IT)

(73) Assignee: BRETON S.P.A., Castello di Godego (IT)

( * ) Notice: Subject to any disclaimer, the term of this patent is extended or adjusted under 35 U.S.C. 154(b) by 748 days.

(21) Appl. No.: 16/474,591

(22) PCT Filed: Dec. 29, 2017

(86) PCT No.: PCT/EP2017/084801
§ 371 (c)(1),
(2) Date: Jun. 28, 2019

(87) PCT Pub. No.: WO2018/122368
PCT Pub. Date: Jul. 5, 2018

(65) Prior Publication Data

US 2019/0334179 A1 Oct. 31, 2019

(30) Foreign Application Priority Data

Jan. 2, 2017 (IT) ........................ 102017000000211

(51) Int. Cl.
*H01M 4/86* (2006.01)
*C01B 32/19* (2017.01)
(Continued)

(52) U.S. Cl.
CPC ........... *H01M 4/8657* (2013.01); *C01B 32/19* (2017.08); *C01B 32/194* (2017.08);
(Continued)

(58) Field of Classification Search
CPC ......... B82Y 30/00; B82Y 40/00; C09D 11/52; H01M 4/8657; H01M 4/9083; H01M 4/9016; C01B 32/194
(Continued)

(56) References Cited

U.S. PATENT DOCUMENTS

2011/0012067 A1* 1/2011 Kay .................... H01M 4/5825 252/507
2013/0184144 A1 7/2013 Liang et al.
(Continued)

FOREIGN PATENT DOCUMENTS

WO 2009127901 A1 10/2009
WO WO-2014032595 A1 * 3/2014 .............. H01M 4/48

OTHER PUBLICATIONS

PCT International Search Report and Written Opinion dated Feb. 1, 2018 for Intl. App. No. PCT/EP2017/084801, from which the instant application is based, 11 pgs.
(Continued)

*Primary Examiner* — Tri V Nguyen
(74) *Attorney, Agent, or Firm* — Fredrikson & Byron, P.A.

(57) ABSTRACT

The invention refers to hierarchical nanocomposites including layered materials supported on suitable carriers. In a preferential aspect of the invention, the layered materials consist of graphene and related materials. In a preferential aspect of the invention, the carrier consists of nanoparticles characterized by a Mohs hardness higher than that of the layered materials included in the hierarchical nanocomposite. These materials, which consist of "core" nanoparticles
(Continued)

(the carrier) wrapped by layered systems (the "shell") such as graphene, graphene oxide and other graphene and related materials (GRMs), are suitable precursors to obtain inks with water. The hierarchical "core-shell" nanocomposites are obtained by a preparation procedure including at least one "in situ" mechanical exfoliation step of the layered materials. The mechanical exfoliation step is carried out owing to a reciprocal friction process between the components of the precursor mixture, that incorporates both the precursors of the layered materials and those of the supporting "core" carriers. The materials are suitable to prepare inks where "core" nanoparticles act as carriers for the single/few-layered supported graphene or GRM.

15 Claims, 11 Drawing Sheets

(51) Int. Cl.
*C01B 32/194* (2017.01)
*H01M 4/90* (2006.01)

(52) U.S. Cl.
CPC ....... *H01M 4/9016* (2013.01); *H01M 4/9083* (2013.01); *C01B 2204/22* (2013.01); *C01P 2002/01* (2013.01); *C01P 2002/82* (2013.01); *C01P 2002/88* (2013.01); *C01P 2004/24* (2013.01); *C01P 2006/40* (2013.01)

(58) Field of Classification Search
USPC .......................... 252/500, 502, 510; 502/175
See application file for complete search history.

(56) References Cited

U.S. PATENT DOCUMENTS

2013/0309495 A1 11/2013 Do et al.
2014/0255785 A1 9/2014 Do et al.
2014/0370387 A1* 12/2014 Anguchamy ......... H01M 4/583 429/223
2017/0338472 A1* 11/2017 Zhamu .............. H01M 10/0525

OTHER PUBLICATIONS

Ajayan, P.M., et al., Nanocomposite Science and Technology, Wiley, 2003, 8 pgs.

Di Noto, V. et al., "New inorganic-organic proton conducting membranes based on Nafion® and [(ZrO2).SiO2)0.67] nanoparticles: Synthesis vibrational studies and conductivity," Journal of Power Sciences 178 (2008), 561-574.

Di Noto, V. et al., "Pt—Fe and Pt—Ni Carbon Nitride-Based 'Core-Shell' ORR Electrocatalysts for Polymer Electrolyte Membrane Fuel Cells," Fuel Cells 10, 2010, No. 2, 234-244.

Di Noto, V. et al., "Inorganic-organic membranes based on Nafion, [(ZrO2)-HfO2)0.25] and [(SiO2)-HfO2)0.28]. Part : Synthesis, thermal stability and performance in a single PEMFC," International Journal of Hydrogen Energy, 37 (2012), 6199-6214.

Djaoued, Y. et al., "Study of Anatase to Rutile Phase Transition in Nanocrystalline Titania Films," Journal of Sol-Gel Science and Technology 24, 2002, 255-264.

Lakes, R., "Materials with structural hierarchy," Nature, vol. 361, Feb. 11, 1993, 511-515.

Malard, L.M. et al., "Raman spectroscopy in graphene," Physics Reports 473 (2009), 51-87.

Wang, L, et al., "Fabrication of hierarchical graphene@Fe3O4@SiO2@polyaniline quaternary composite and its improved electrochemical performance," Journal of Alloys and Compounds 634 (2015), 232-238.

Bertasi, F. et al., "A Key concept in Magnesium Secondary Battery Electrolytes," ChemSusChem 2015, 8, 3069-3076.

Ferrari, A.C. et al., "Science and technology roadmap for graphene, related two-dimensional crystals, and hybrid systems," Nanoscale, 2015, 7, 4598-4810.

* cited by examiner

GRAPHENE AND OTHER 2D MATERIALS AS LAYERED "SHELLS" SUPPORTED ON "CORE" NANOPARTICLE CARRIERS

RELATED APPLICATIONS

This application is a 35 U.S.C. 371 national stage filing from International Application No. PCT/EP2017/084801, filed Dec. 29, 2017, which claims priority to Italian Application No. 102017000000211, filed Jan. 2, 2017, the teachings of which are incorporated herein by reference.

The invention refers to new nanocomposites and, particularly to hierarchical nanocomposites including layered materials supported on suitable carriers. In a preferential aspect of the invention, the layered materials consist of graphene and related materials. In a preferential aspect of the invention, the carrier consists of nanoparticles characterized by a Mohs hardness higher than that of the layered materials included in the hierarchical nanocomposite. These materials, which consist of "core" nanoparticles (the carrier) wrapped by layered systems (the "shell") such as graphene, graphene oxide and other graphene and related materials (GRMs), are suitable precursors to obtain inks with water. The hierarchical "core-shell" nanocomposites are obtained by a preparation procedure including at least one "in situ" mechanical exfoliation step of the layered materials. The mechanical exfoliation step is carried out owing to a reciprocal friction process between the components of the precursor mixture, that incorporates both the precursors of the layered materials and those of the supporting "core" carriers. The chemical and physical properties of the hierarchical nanocomposites can be tuned: (a) by adding further components in the precursor mixture before the mechanical exfoliation steps; (b) by chemical modulation, pyrolysis processes and electrochemical treatments of the "core-shell" hierarchical nanocomposites obtained as here described. Finally, the hierarchical "core-shell" nanocomposite materials here proposed consist of single or multi-layered "shells" supported on "core" nanoparticles as carriers. The materials are suitable to prepare inks where "core" nanoparticles act as carriers for the single/few-layered supported graphene or GRM.

FIELD OF THE INVENTION

One of the most active research fields in modern materials science is concerned with layered materials (also called "LM"; see A. C. Ferrari et al., Nanoscale 7, (2015) 4598-4810), including: (a) graphene and related materials (GRMs); (b) hexagonal boron nitride (h-BN); (c) molybdenum disulfide ($MoS_2$); (d) bismuth selenide ($Bi_2Se_3$); (e) antimony telluride ($Sb_2Te_3$), among many others. Ideally, layered materials consist of one-atom-thick crystalline layers; accordingly, the morphology of layered materials is practically two-dimensional. All of these features strongly affect the physicochemical properties of layered materials, which are typically very different and significantly improved in comparison with those of the corresponding "bulk" materials with the same chemical composition. In this respect, the case of graphene is exemplary. Graphene consists of bidimensional, one-atom-thick layers of carbon atoms, each exhibiting a $sp^2$ hybridization. Graphene is characterized by a number of extraordinary physicochemical properties, including: (a) a very high mobility of the charge carriers (up to more than 200000 $cm^2 \cdot V^{-1} \cdot s^{-1}$); (b) an extremely large specific surface area (up to about 2600 $m^2 \cdot g^{-1}$); and (c) a Young modulus of 1 TPa (about 5 times larger than that of steel). In comparison "conventional" graphite, which comprises a very large number of graphene layers stacked upon one another and bound together by van der Waals forces, exhibits a mobility of the charge carriers of about 6000 $cm^2 \cdot V^{-1} \cdot s^{-1}$, a significantly lower specific surface area (with typical values on the order of about 250 $m^2 \cdot g^1$), and finally a vastly inferior Young modulus (values of 0.03 TPa are usual).

Nature offers a very broad class of 2D crystals. There are several LMs which retain their stability in the form of monolayer and whose properties are complementary to those of graphene. Transition metal oxides (TMOs) and transition metal dichalcogenides (TMDs) also have a layered structure.

Atoms within each layer are held together by covalent bonds, while van der Waals interactions hold the layers together. LMs include a large number of systems with interesting properties. E.g., $NiTe_2$ and $VSe_2$ are semi-metals, $WS_2$, $WSe_2$, $MoS_2$, $MoSe_2$, $MoTe_2$, $TaS_2$, $RhTe_2$, $PdTe_2$ are semiconductors, h-BN, and $HfS_2$ are insulators, $NbS_2$, $NbSe_2$, $NbTe_2$, and $TaSe_2$ are superconductors. Moreover, there are other LMs such as $Bi_2Se_3$, $Bi_2Te_3$ that show thermoelectric properties and may behave as topological insulators (TIs).

Atomic layers of these materials can be produced using mechanical or liquid-phase exfoliation (see A. C. Ferrari et al., Nanoscale 7, (2015) 4598-4810).

These figures witness clearly the exceptional potential of layered materials in the development of disruptive technologies with a performance level well beyond the modern state of the art. A massive R&D effort is currently underway at the world level with the ultimate aim to exploit the advantages of layered materials and take them to the market in a very wide variety of technological fields (e.g., electronic devices, energy conversion and storage, photonics, optoelectronics, composites, among many others).

As of today GRMs, which include graphene and its derivatives (e.g., graphene oxide, GO, reduced graphene oxide, rGO, graphene nitride, GN, among many others) have attracted most of the research efforts devoted to layered materials. From a technological perspective, this is mostly originated from the very high abundance and low cost of the raw material (i.e., carbon), and from the ease with which GRMs can be tailored to meet the requirements of a wide variety of applications (e.g., microelectronics, spintronics, energy conversion and storage devices, composites). A number of important shortcomings must still be addressed to fully exploit the potential of GRMs in general and of graphene in particular. One important issue is concerned with the fabrication of affordable one-layer thick graphene. A number of approaches have been explored, which demonstrated that it is feasible to fabricate large, one-layer thick graphene samples. In this regard, one of the best solutions is to use chemical vapor deposition (CVD) routes on suitable sacrifical supports (e.g., copper), which are subsequently etched. Other possibilities include the adoption of molecular beam epitaxy (MBE), or of inductively-coupled plasma CVD; both approaches typically rely on silicon substrates. Unfortunately, even if the quality of the graphene sheets obtained with all the above "bottom-up" synthetic routes is remarkable, the associated production costs are too high for the large amounts of graphene required by a number of advanced applications (e.g., structural composites for the aerospace market, energy conversion and storage). It is also possible to obtain graphene sheets by exfoliating suitable precursors. In a typical approach, graphite is exfoliated by a series of successive treatments in strongly oxidizing media (e.g., by following the Hummer's method). In a successive step, the resulting product (graphene oxide) undergoes reduction and graphene is obtained. Another possibility is to carry out the exfoliation step by sonicating a dispersion of graphite in a suitable liquid medium; this approach is troublesome as it typically requires toxic, high-boiling solvents (e.g., N-methyl pyrrolidone, NMP) which are difficult to remove from the final product. Large amounts of affordable graphene are generally obtained with "top-down" approaches involving some form of exfoliation of graphitic precursors. Unfortunately, with this approach it is difficult to completely remove the stacking of the graphene sheets and obtain true one-layer materials. It is often problematic to process GRMs; this is especially the case for graphene. This shortcoming is ultimately associated with the low chemical reactivity of a graphene sheet. Indeed: (i) the carbon atoms within the graphene sheet are bound with one another through strong covalent bonds; and (ii) in principle both faces of a graphene sheet are covered by a symmetrical and almost uniform distribution of $\pi$ electrons; no permanent electric dipoles or lone electron pairs are present, and the polarizability of the $\pi$ electrons of graphene is quite low. As a result of (i) and (ii), strongly oxidizing/reducing species are typically needed to functionalize the basal graphene sheet; furthermore, pristine graphene is not suspended easily in highly polar protic solvents (e.g., water, lower alcohols). This latter shortcoming is particular relevant for practical applications. In particular, the fabrication of a number of devices (e.g., nanocomposities, electronic systems, energy conversion and storage apparatuses) often requires the application of functional/structural layers characterized by well-controlled physicochemical properties and morphology. This aim can be achieved quite easily by taking advantage of several well-established processing techniques (e.g., spraying, dipping, solvent-casting, among many others), all of which require a homogeneous fluid working medium including the desired functional/structural component and a suitable solvent. The final functional/structural layer is obtained upon removing the excess solvent included in such a fluid working medium. On these basis, it is highly advisable using a solvent which is not toxic, easy to remove and cheap. Further advantages are achieved if the solvent is able to suspend/disperse a high concentration of the desired functional/structural component, to reduce the bulk of the fluid working medium and the amount of the solvent to be removed. As of today, the best solvents for pristine graphene are toxic, high-boiling liquids such as NMP, which raise significant environmental concerns. Furthermore, the maximum concentration of graphene in a typical NMP-based suspension is quite low, on the order of a few grams per liter. For all these reasons, the applicability of pristine graphene at the industrial level is hindered.

As the basal plane of graphene undergoes functionalization (e.g., by substituting carbon atoms with heteroatoms such as oxygen or nitrogen), the physicochemical properties of the material are strongly affected. In general the processability increases, since the functionalized graphene is able to better interact with the surrounding chemical environment. As an example, a graphene sheet where a fraction of basal carbon atoms is substituted by oxygen is better capable to undergo suspension in highly polar protic solvents (e.g., water or lower alcohols). This phenomenon is ultimately associated with the introduction of defects in the bulk electronic structure of graphene; local permanent electric dipoles and electron lone pairs are introduced, which facilitate the establishments of interactions (e.g., hydrogen bonds) with the molecules of the solvent. On the other hand, such defects in the bulk electronic structure of graphene negatively affect some of its most attractive properties (e.g., the charge mobility) since they act as "electron traps".

A real graphene sheet includes two main types of carbon atoms, namely: (i) "basal" carbon atoms, which make up the majority of the graphene sheet and are each surrounded by three other carbon atoms; and (ii) "edge" carbon atoms, which are located at the boundary of the graphene sheet and have a lower number of neighbouring carbon atoms. With respect to "basal" carbon atoms, "edge" carbon atoms exhibit a vastly higher reactivity since their chemical bonds are not completely saturated. One possible strategy to increase the processability of graphene is to functionalize the "edge" carbon atoms without substituting the basal carbon atoms with heteroatoms. Accordingly, (i) the bulk electronic structure of the graphene sheet is not altered significantly, together with its remarkable physicochemical properties; and (ii) a sufficient number of local permanent electric dipoles and electron lone pairs is introduced, which promote the establishment of interactions with the surrounding environment. This approach is particularly suitable to improve the processability of relatively small graphene flakes, which find extensive application in fields where it is not strictly necessary to implement large graphene sheets (e.g., structural nanocomposites or energy conversion and storage systems).

DESCRIPTION OF THE INVENTION

The present patent is concerned with new nanocomposites and, particularly to new hierarchical nanocomposites (hereafter also called "FL/CA"). A nanocomposite is a multiphase material where at least one of the constituent phases has one dimension less than 100 nanometers (nm); see for instance Ajayan et al. Nanocomposite Science and Technology, Wiley, 2003.

Hierarchical materials are well known in the art and art disclosed for instance by R. Lakes, Materials with Structural Hierarchy, Nature 361, (1993) 511-515, herein incorporated by reference.

A "hierarchical nanocomposite" is a system that exhibits a morphology whose features can be broken down into at least two different size levels, i.e.:

- a "higher" size level (typically associated with the lateral dimensions of each sheet of layered material used as the "shell"; in general, it is on the order of a few hundreds of nanometers or less);
- a "lower" size level (typically associated with the dimension of the particles used as the carrier "core"; in general, it is on the order of a few tens of nanometers or less). Graphene-based nanocomposites exhibiting a "hierarchical structure" including graphene sheets supporting nanoparticles, are disclosed for instance by L. Wang et al., Journal of Alloys and Compounds, 634, (2015) 232-238, also herein incorporated by reference. FL/CA are obtained by carrying out a suitable mechanical exfoliation step (e.g., milling; hereafter, this step is also called "MES") on a suitable precursor mixture (hereafter also called "PM"), which typically includes at least two components, namely: (i) a layered material (hereafter also called "FL"); and (ii) a carrier (hereafter also called "CA"). The fundamental steps involved in this invention are summarized in FIG. 1.

Typically, the mechanical exfoliation step yields the following effects on the various components of the precursor mixture: (i) the layered material undergoes exfoliation; and (ii) the layered material establishes chemical interactions with the carrier; in the final FL/CA hierarchical nanocomposite, the flakes of layered material are supported by the carrier. The proposed approach to obtain FL/CAs is able to address very satisfactorily several of the typical issues suffered by conventional layered materials, with a particular reference to:

1. residual stacking;
2. low reactivity;
3. poor processability.

1. During the mechanical exfoliation step, the particles of the carrier act as "nano-grinders" and prompt the mechanical exfoliation of the layered material introduced in the precursor mixture. This phenomenon can be exploited by preparing precursor mixtures including: (i) a cheap layered material with a significant residual stacking; and (ii) a suitable carrier. During the mechanical exfoliation step, the exfoliation of the starting layered material occurs and no stacking of the layered material is detected in the resulting FL/CA hierarchical nanocomposite.
2. Another typical outcome of the mechanical exfoliation step is the reduction in the lateral size of the sheets of the starting layered material. Indeed, the particles of carrier act as "nano-grinders" and shred the sheets of the starting layered material. Accordingly, in the final FL/CA the ratio between the number of atoms at the edge of the layered material and the number of atoms constituting the basal planes of the flakes of layered material is much larger in comparison with the initial layered material included in the precursor mixture. As a result, the overall reactivity of the flakes of layered material is enhanced, as the atoms at the edge of the flakes of layered material are much more prone to form chemical bonds with other species present in the environment (e.g., CA, other additional components present in the precursor mixture, other volatile species filling the closed vessel where the mechanical exfoliation step is carried out).
3. At the end of the mechanical exfoliation step the surface of FL/CA is covered by functional groups, whose composition and concentration can be easily modulated by a suitable choice of (i) the components included in the precursor mixture (e.g., FL, CA, other additional components present in the precursor mixture, other volatile species filling the closed vessel where the mechanical exfoliation step is carried out); and (ii) the parameters of the mechanical exfoliation step (e.g. T, profile of rpm vs. t). This good control on the surface functional groups allows tailoring the interactions between the FL/CA hierarchical nanocomposite and the environment.

The crucial implications of the above features exhibited by FL/CA hierarchical nanocomposites are better elucidated with an example. A FL/CA hierarchical nanocomposite can be devised including graphene (as the layered material), and $SiO_2$ nanoparticles (as the carrier). At the end of the mechanical exfoliation step, the layered material and the carrier strongly interact in the final FL/CA hierarchical nanocomposite. Once the layered material has undergone exfoliation, very little residual stacking is detected in the final FL/CA. Single graphene sheets are found in the FL/CA hierarchical nanocomposite; in some instances, the single graphene sheets form a one/few layer-coating on the surface of carrier $SiO_2$ nanoparticles (see example 2). The lateral size of the layered material sheets has significantly decreased, reaching a few hundreds of nm down from an initial value close to 1-2 micrometers in the initial graphene nanoplatelets used as starting layered material (see FIG. 5). Within the framework of the description, the term "graphene nanoplatelets" is used to indicate small stacks of graphene.

The carrier is covered by a significant surface concentration of —OH functional groups. As this particular FL/CA is put into contact with a highly polar solvent (e.g., water, methyl alcohol or ethyl alcohol), the —OH groups covering the carrier nanoparticles promote the establishment of significant interactions (e.g., hydrogen bonds) between the particles of the FL/CA hierarchical nanocomposite and the molecules of the solvent. Consequently, the particles of the FL/CA hierarchical nanocomposite "as a whole" can undergo suspension in the solvent, forming a homogeneous ink that can be used as the fluid working medium for a number of deposition/application techniques (e.g., solvent-casting, dipping, spraying). In summary, the proposed approach allows to obtain hierarchical nanocomposites where one component (in the example above, the $SiO_2$ carrier) is used to bring into suspension a layered material (in the example above, the graphene flakes of layered material), which would not have undergone suspension if taken on its own. This suspension of the FL/CA hierarchical nanocomposite does not need to be based on toxic, high-boiling solvents (e.g., NMP); furthermore, the layered material is able to undergo suspension without the use of any surfactant. In a sense, the FL/CA hierarchical nanocomposites described in this invention use the carrier as a kind of "solid-state surfactant", bringing the layered material into suspension without compromising its properties, surface features and reactivity.

The basic preparation procedure described above, which yields the FL/CA hierarchical nanocomposites, is susceptible of a number of variations. In detail:

- The precursor mixture does not need to include a layered material; in principle, it is possible to introduce into the precursor mixture a "precursor" of one or more layered materials (e.g., a partially-expanded graphite), whose exfoliation is taken to completion during the mechanical exfoliation step.
- It is also possible to introduce into the precursor mixture either (i) the layered material and the carrier which will end up in the final FL/CA hierarchical nanocomposite, and/or (ii) precursors of the layered material and the carrier (hereafter labeled as "pFL" and "pCA", respectively). pFL and pCA will then become the final mixture of layered material and carrier during the mechanical exfoliation step.
- The precursor mixture can include one or more pFL (or FL) and pCA (or CA).
- The precursor mixture can include one or more additional components (hereafter labeled as "$AC_x$") beyond pFL (or FL) and pCA (or CA), including: (i) liquids (e.g., one or more of various solvents such as water, alcohols, ketones, dimethylformamide); (ii) "hard" solids (e.g., one or more of ceramics, metals, carbides, nitrides); "soft" solids (e.g., one or more macromolecule, carbon black, carbon nanotubes). It is also possible to fill the closed vessel where the mechanical exfoliation step is carried out with suitable gaseous mixtures, establishing the desired pressure. All these $AC_x$ are meant to finely control the physicochemical properties of the precursor mixture, especially in terms of rheology and chemical composition. Accordingly, the mechanical exfoliation step can be used to achieve a better control on the features of the final FL/CA hierarchical nanocomposite (e.g., one $AC_x$ included in the precursor mixture can be used to functionalize the edges of the layered material during the mechanical exfoliation step). The fundamental steps involved in the preparation of hierarchical nanocomposites including $AC_x$ in the precursor mixture are represented in FIG. 2.

The mechanical exfoliation step can also be adopted to modulate the chemical composition of the layered material and/or the carrier. As an example, the mechanical exfoliation step can be carried out in a suitable "sacrifical grinding system" including a closed vessel and mobile grinding objects (e.g., balls) with a Mohs hardness lower than that of the carrier. In this family of embodiments of the invention, during the mechanical exfoliation step, the carrier may undergo coating with a layer of the same composition of the "sacrifical grinding system". As a result, the carrier particles may assume a "core-shell" morphology, as shown in the previous art (see for instance: V. Di Noto et al., J. Power Sources 178 (2008) 561-574; V. Di Noto et al., Int. J. Hydrog. Energy 37 (2012) 6199-6214).

The features of the final FL/CA hierarchical nanocomposite can also be fine-tuned by a suitable control of the mechanical exfoliation step parameters, including the T vs. t and the rpm vs. t profiles.

The mechanical exfoliation step can be followed by a suitable "post-milling process", which yields the final FL/CA hierarchical nanocomposite. Three main types of "post-milling process" are envisaged, as follows: (i) Chemical treatment (hereafter also called "CT"); (ii) pyrolysis process (hereafter also called "PyP"); (iii) electrochemical treatment (hereafter also called "ET"). The chemical treatment is carried out in a suitable medium (e.g., water, another solvent or mixture of solvents, one or more ionic liquids) and is typically meant to remove from the product of the mechanical exfoliation step: (i) one or more of the $AC_x$ originally included in the precursor mixture; and/or (ii) contaminants; and/or (iii) mechanical exfoliation step's byproducts. For the best effect, in some instances it may be useful to modulate the pH of the medium used to carry out the chemical treatment by using suitable acid or bases. As an example, in one embodiment of the invention it may be envisaged to devise a precursor mixture including graphene (as FL), $SiO_2$ (as CA) and ZnO (as an $AC_x$). After the mechanical exfoliation step, ZnO can be removed by a CT, which may be carried out with a 0.1 M HCl aqueous solution, yielding the final Graphene/$SiO_2$ hierarchical nanocomposite. The pyrolysis process is meant to modulate the physicochemical properties of the product of the mechanical exfoliation step to obtain the final FL/CA hierarchical nanocomposite. As an example, in one embodiment of the invention it may be envisaged to devise a precursor mixture including graphene (as FL), $SiO_2$ (as CA) and a solution of polyethylene in toluene (as $AC_x$). The product of the mechanical exfoliation step then undergoes a two-step PyP, which is carried out under dynamic vacuum. The first step is executed at T=120° C., and is meant to remove the toluene solvent. The second step takes place at T=550° C., and is meant to pyrolyze the remaining polyethylene; the pyrolysis products are incorporated in the final Graphene/$SiO_2$ hierarchical nanocomposite. The electrochemical treatment is mainly meant as a further tool to selectively etch one or more of the components included in the product of the mechanical exfoliation step. As an example, in one embodiment of the invention it may be envisaged to devise a precursor mixture including graphene (as FL), $SiO_2$ (as CA) and Ni nanoparticles (as an $AC_x$). The product of the mechanical exfoliation step is bound in an electrode, which undergoes a voltammetric cycling at 50 $mV \cdot sec^{-1}$ between −0.1 and 1.2 V vs. RHE in 0.1 M HCl lasting 500 cycles. This treatment selectively etches Ni from the product of the mechanical exfoliation step, and yields the final Graphene/$SiO_2$ hierarchical nanocomposite. FIG. 3 shows the main steps involved in the preparation of FL/CA hierararchical nanocomposites as the product of the mechanical exfoliation step undergoes further post-milling processes.

More than one "post-milling process" of different types, chosen among CT, PyP and ET, can be carried out in succession on the product of the mechanical exfoliation step.

More than one mechanical exfoliation step can be carried out, each time adding different pFL (or FL), pCA (or CA), $AC_x$ and modulating the mechanical exfoliation step's parameters (grinding environment, including the T vs. t and the rpm vs. t profiles).

The FL/CA hierarchical nanocomposites of this invention are particularly suitable for applications where it is desirable to adopt small layered material flakes bearing the desired edge functionalities, yielding systems characterized by a large surface area. Accordingly, FL/CA hierarchical nanocomposites are ideal for the following applications: (i) catalysis and electrocatalysis (e.g., as supports and/or as full-fledged catalysts/electrocatalysts); (ii) electrode systems for energy conversion/storage systems (e.g., fuel cells, secondary batteries, redox flow batteries, dye-sensitized solar cells, supercapacitors); (iii) development of structural/functional nanocomposites (e.g., light, high-strength systems for application in the automotive and aerospace industry).

The flexibility of the preparation protocol yielding the FL/CA hierarchical nanocomposites of this invention is outstanding. A suitable choice of the preparation parameters allows modulating the physiscochemical properties of the products in a very broad range, achieving FL/CA with a well-controlled chemical composition and morphology. A few examples are shown in FIG. 4.

DETAILED DESCRIPTION OF THE INVENTION

Figure 1:
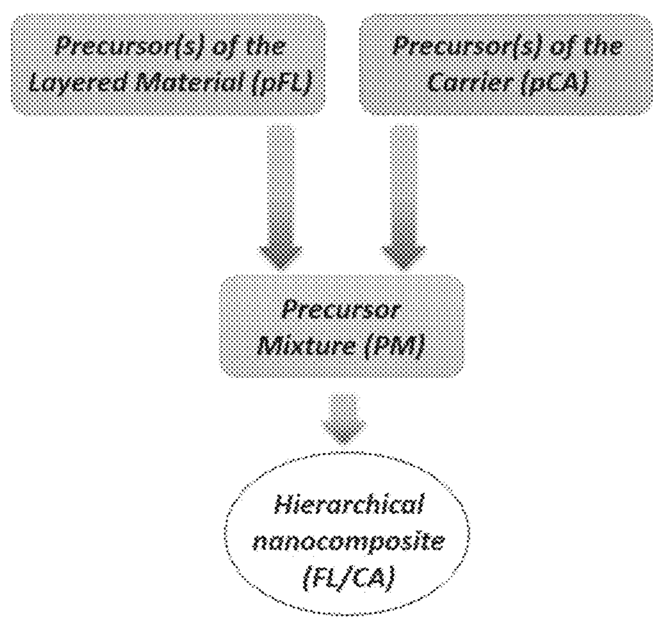
FIG. 1: Fundamental steps involved in the preparation of FL/CA hierarchical nanocomposites.
Figure 2:
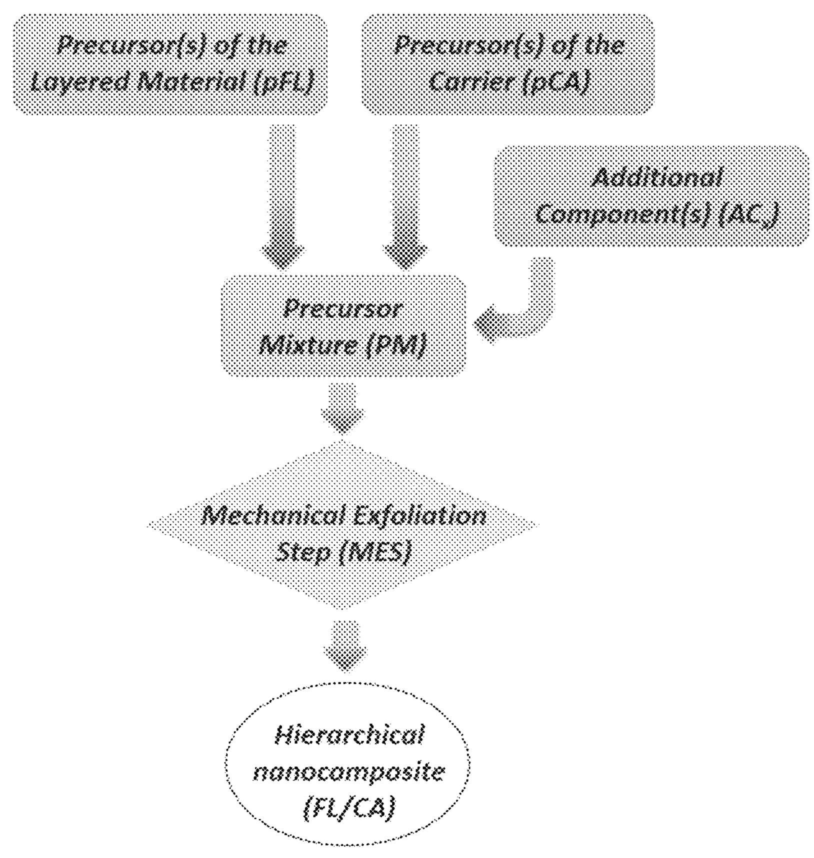
FIG. 2: Preparation of FL/CA hierarchical nanocomposites starting from a precursor mixture including $AC_x$.
Figure 3:
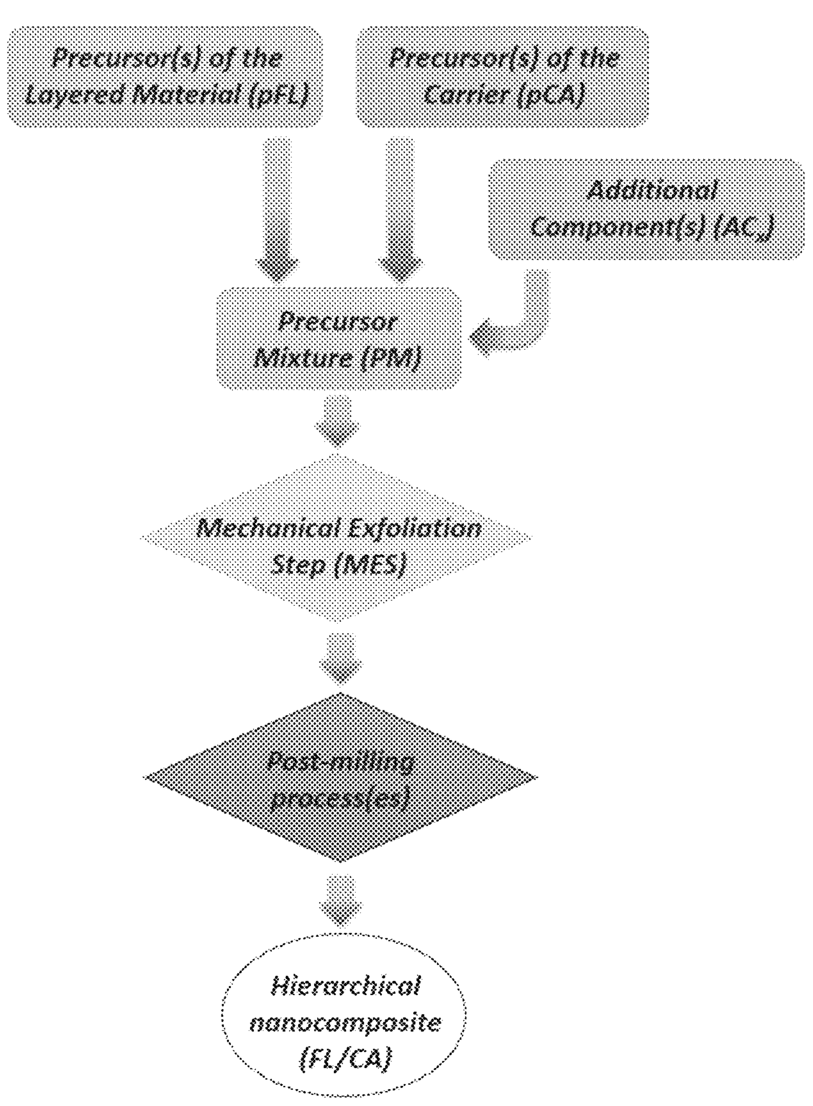
FIG. 3: Preparation of FL/CA hierarchical nanocomposites with further post-milling processes after the MES.
Figure 4:
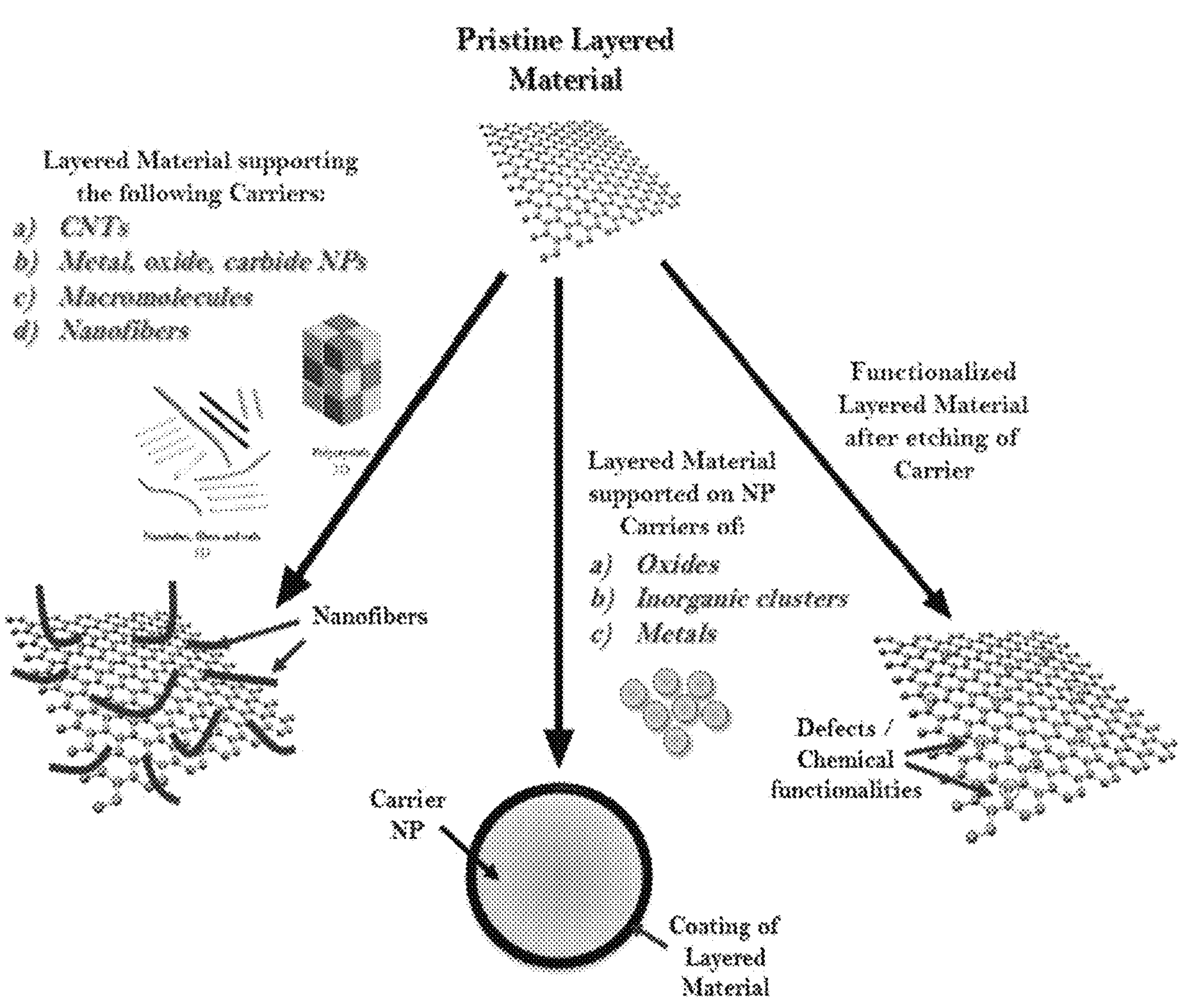
FIG. 4: A few examples of the products that can be obtained with the preparation protocol outlined in this invention.

The invention relates to FL/CA hierarchical nanocomposites comprising one or more layered materials supported on one or more suitable carrier.

According to the invention, the layered material may be a GRM. In another aspect of the invention, the layered material may consist of graphene. In another particular aspect of the invention, the layered material may consist of one or more of graphene oxide, graphene nitride, graphene functionalized with —COOH and/or —OH groups.

According to the invention, the carrier particles may have a size ranging from 1 to 1000 nm, preferably from 20 to 100 nm. In a particular aspect of the invention, the carrier consists of nanometric oxoclusters (i.e., nanoparticles of oxides also having a size ranging from 1 to 1000 nm, preferably from 20 to 100 nm). In another particular aspect of the invention, the carrier consists of nanometric oxoclusters of one or more of Si, Ti, W, Ta, Zr, Hf. In a particular aspect of the invention, the carrier consists of nanometric metal particles. In another particular aspect of the invention, the carrier consists of nanometric metal particles of one or more of Ni, Fe, Au, Ag. In a particular aspect of the invention, the carrier consists of nanometric carbide particles. In another particular aspect of the invention, the carrier consists of nanometric particles of one or more of tungsten carbides, silicon carbide, titanium carbide, boron carbide. In a particular aspect of the invention, the carrier consists of nanometric nitride particles. In another particular aspect of the invention, the carrier consists of nanometric particles of one or more of boron nitride, silicon nitride, tungsten nitride, titanium nitride. In yet another aspect of the invention, the carrier consists of one or more of nanometric particles of oxoclusters, metals, carbides, and nitrides.

FL/CAs are obtained by carrying out a mechanical exfoliation step on a precursor mixture including: (i) pFL; and (ii) optionally, pCA.

In a particular aspect of the invention, pFL and and pCA are the same layered material and carrier included in the final FL/CA. In a particular aspect of the invention, the layered material and carrier are obtained respectively from pFL and pCA upon carrying out the mechanical exfoliation step on the precursor mixture which gives rise to the final FL/CA hierarchical nanocomposite.

In a particular aspect of the invention, the precursor mixture includes one or more other components (hereafter labeled as "$AC_x$", where x=1, 2 . . . n) different from either pFL and pCA. In another particular aspect of the invention, $AC_x$ are one or more of: (i) water; (ii) protic organic solvents (e.g., methanol, ethanol, propanol, 2-propanol, butanol); (iii) aprotic polar solvents (e.g., dimethylformamide, dimethylacetamide, N-methyl pyrrolidone); (iv) apolar solvents (e.g., hexane, heptane, benzene); (v) halogenated solvents (e.g., chloroform, dichloromethane, tetrachloroethylene, hydrofluorocarbons); (vi) macromolecules (e.g., polyethylene, polypropylene, polybenzimidazole, polyvinylpyrollidone, polyurethane); (vii) ionic compounds (e.g., halides of alkaline and alkaline-earth metals); (viii) other inorganic salts (e.g., carbonates/sulfates/nitrates/phosphates/sulfides of alkaline and alkaline-earth metals); (ix) ionic liquids; and (x) other inorganic compounds/nanostructures (e.g., carbon black, carbon nanotubes, talc, other silicates).

In a particular aspect of the invention, the mechanical exfoliation step is carried out in a suitable sacrifical grinding system; during the mechanical exfoliation step, a portion of the sacrifical grinding system is incorporated in the final FL/CA. In another particular aspect of the invention, the sacrifical grinding system comprises a closed vessel and mobile grinding objects (e.g., balls); such closed vessel and mobile grinding objects are made of one or more of steel, agate, zirconia, and tungsten carbide.

In a particular aspect of the invention, the closed vessel where the mechanical exfoliation step is carried out is filled with air. In a particular aspect of the invention, the closed vessel where the mechanical exfoliation step is carried out is evacuated. In a particular aspect of the invention, the closed vessel where the mechanical exfoliation step is carried out is filled with one or more inert gas (e.g., He, Ar, Kr, Xe, $N_2$, $CO_2$). In a particular aspect of the invention, the closed vessel where the mechanical exfoliation step is carried out is filled with one or more reactive gas (e.g., $H_2$, $CH_4$, HCl, CO, $F_2$, $Cl_2$, $O_2$). In another particular aspect of the invention, the closed vessel where the mechanical exfoliation step is carried out is filled with one or more inert gas and one or more reactive gas.

In a particular aspect of the invention, the mechanical exfoliation step is carried out with a planetary ball mill. In another particular aspect of the invention, the mechanical exfoliation step is carried out by rotating the grinding vessel mounted in the planetary ball mill at a fixed value in the range between 1 and 2000 rpm. In yet another particular aspect of the invention, the mechanical exfoliation step is carried out subjecting the grinding vessel to a controlled rpm vs. t profile, where rpm is controlled in the range between 1 and 2000 rpm.

In a particular aspect of the invention, the mechanical exfoliation step is carried out at room temperature. In another particular aspect of the invention, the mechanical exfoliation step is carried out at a fixed temperature, which is set at a value falling in the range between −195° C. and +1200° C. In yet another particular aspect of the invention, the mechanical exfoliation step is carried subjecting the grinding vessel to a controlled T vs. t profile, where T is controlled in the range between −195° C. and +400° C.

In a particular aspect of the invention, the mechanical exfoliation step is carried out at a pressure of about 0.1 MPa. In another particular aspect of the invention, the mechanical exfoliation step is carried out after controlling the pressure of the grinding environment (typically, this is pressure inside the grinding vessel) in the range between $10^{-4}$ and 100 MPa. In yet another particular aspect of the invention, the mechanical exfoliation step is carried out following a controlled P vs. t profile, where P is controlled in the range between $10^{-4}$ and 100 MPa.

In a particular aspect of the invention, the final FL/CA is obtained by subjecting the product of the mechanical exfoliation step to a chemical treatment "CT" with one or more solvent, chosen among: (i) water; (ii) protic organic solvents (e.g., methanol, ethanol, propanol, 2-propanol, butanol); (iii) aprotic polar solvents such as dimethylformamide (DMA), dimethylacetamide (DMAc), N-methyl pyrrolidone (NMP); (iv) apolar solvents, such as hexane, heptane, benzene; (v) halogenated solvents, such as chloroform, dichloromethane, tetrachloroethylene, hydrofluorocarbons; and (vi) ionic liquids. In another particular aspect of the invention, the solvent dissolves/suspends one or more of: (i) macromolecules, such as polyethylene (PE), polypropylene (PP), polybenzimidazole (PBI), polyvinylpyrollidone (PVP), polyurethane (PU); (ii) ionic compounds, such as halides of alkaline and alkaline-earth metals) (iii) other inorganic salts, such as carbonates/sulfates/nitrates/phosphates/sulfides of alkaline and alkaline-earth metals; (iv) acids, such as benzoic acid, acetic acid, formic acid, HCl, HF, HBr, HI, $H_2SO_4$, $HNO_3$, $HClO_4$, $H_3PO_4$; (v) bases, such as $NH_3$, primary amines, secondary amines, tertiary amines, hydroxides of alkaline and/or alkaline-earth metals; and (vi) other inorganic compounds/nanostructures, such as carbon black, carbon nanotubes, talc, other silicates.

In a particular aspect of the invention, the final FL/CA is obtained by subjecting the product of the mechanical exfoliation step to a pyrolysis process "PyP" at a temperature between 100 and 1200° C. In another particular aspect of the invention, the product of the mechanical exfoliation step undergoes a PyP following a controlled T vs. t profile, where T is controlled in the range between 100 and 1200° C. In a particular aspect of the invention, the PyP is carried out under vacuum. In another particular aspect of the invention, the PyP is carried out under one or more inert gas (e.g., He, Ar, Kr, Xe, $N_2$, $CO_2$). In a particular aspect of the invention, the PyP is carried out is under one or more reactive gas (e.g., $H_2$, $CH_4$, HCl, CO, $F_2$, $Cl_2$, $O_2$, vapors of one or more volatile organic compounds such as alcohols, amines, acetonitrile). In another particular aspect of the invention, the PyP is carried out under one or more inert gas and one or more reactive gas.

In a particular aspect of the invention, the final FL/CA is obtained by subjecting the product of the mechanical exfoliation step to an electrochemical treatment "ET", as follows. The product of the mechanical exfoliation step is bound to a suitable electrode, which is immersed in a suitable support electrolyte; the electrode undergoes an ET following a controlled E (electrochemical potential) vs. t profile, where E is controlled in the range between −5 and +5 V vs. RHE ("Reversible Hydrogen Electrode"). In a particular aspect of the invention, the E vs. t profile includes one or more potentiostatic or potentiodynamic steps; the sweep rate of the potentiodynamic steps falls in the range between −500 and +500 $mV \cdot sec^{-1}$. In another particular aspect of the invention, the support electrolyte is a solvent (e.g., one or more of water, methyl alcohol, ethyl alcohol, acetonitrile, a ionic liquid) dissolving a suitable solute, which may include one or more of: (i) ionic compounds (e.g., halides of alkaline and alkaline-earth metals); (ii) other inorganic salts (e.g., carbonates/sulfates/nitrates/phosphates/sulfides of alkaline and alkaline-earth metals); (iii) acids (e.g., benzoic acid, acetic acid, formic acid, HCl, HF, HBr, HI, $H_2SO_4$, $HNO_3$, $HClO_4$, $H_3PO_4$); (iv) bases (e.g., $NH_3$, primary amines, secondary amines, tertiary amines, hydroxides of alkaline and/or alkaline-earth metals). In another particular aspect of the invention, the ET is carried out bubbling in the support electrolyte one or more inert gases (e.g., He, Ar, Kr, Xe, $N_2$, $CO_2$). In another particular aspect of the invention, the ET is carried out bubbling in the support electrolyte one or more reactive gases (e.g., $H_2$, $CH_4$, HCl, CO, $F_2$, $Cl_2$, $O_2$). In another particular aspect of the invention, the ET is carried out bubbling in the support electrolyte one or more inert gas and one or more reactive gas.

In a particular aspect of the invention, the final FL/CA is obtained by applying a succession of post-synthesis activation steps, including one or more of CT, PyP and ET, to the product of the mechanical exfoliation step.

In a particular aspect of the invention, the product of the mechanical exfoliation step and, optionally, of the post-synthesis activation steps is put back into the grinding system, where a new mechanical exfoliation step is carried out to obtain the final FL/CA. In another aspect or the invention, each new mechanical exfoliation step is carried out with different parameters in terms of composition of the closed vessel and grinding objects, gas filling the closed vessel, rpm profile, temperature profile, and pressure profile. In another aspect of the invention, additional pFL and/or pCA and/or $AC_x$ are added in the grinding vessel before the new mechanical exfoliation step is carried out. In another aspect of the invention, the final FL/CA is obtained after the desired number of mechanical exfoliation step and post-synthesis activation steps, optionally adding additional pFL and/or pCA and/or $AC_x$.

The following examples are meant to describe particular aspects of the invention.

Example 1

Preparation of Graphene/$TiO_2$ Hierarchical Nanocomposite

Graphene nanoplatelets with a thickness of 2-10 nm are adopted as pFL; $TiO_2$ nanoparticles (0=25 nm, 99.7 wt % $TiO_2$) are used as pCA. 3 g of $TiO_2$ NPs are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/$TiO_2$" nanocomposite.

Example 2

Preparation of Graphene/$SiO_2$ Hierarchical Nanocomposite

Graphene nanoplatelets with a thickness of 2-10 nm are adopted as pFL; $SiO_2$ nanoparticles (0=7 nm, 99.8 wt % $SiO_2$) are used as pCA. 3 g of $SiO_2$ NPs are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/$SiO_2$" hierarchical nanocomposite.

Example 3

Preparation of Graphene/ZnO Hierarchical Nanocomposite

Graphene nanoplatelets with a thickness of 2-10 nm are adopted as pFL; ZnO powders (99 wt % ZnO) are used as pCA. 3 g of ZnO powders are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/ZnO" hierarchical nanocomposite.

Example 4

Preparation of $FeSn_{0.5}$—$CN_1$ 900/(Graphene/$SiO_2$) Electrocatalyst 250 mg of deoxyribonucleic acid (DNA) from salmon testes (91.3%) are swollen overnight into 25 mL of bidistilled water, yielding solution A. 40.6 mg of $FeCl_3$ 97 wt % are dissolved into ca. 500 μL, of bidistilled water, yielding solution B. 27.5 mg of $Sn(CH_3)_2Cl_2$, 95 wt % are dissolved into ca. 500 μL, of bidistilled water, yielding solution C. Solution B and Solution C are added into Solution A under vigorous stirring; the product is left under stirring for 24 h and subsequently added with 1250 mg of the Graphene/$SiO_2$ nanocomposite obtained in example 3. The resulting product is homogenized by probe sonication and then stirred for 48 h, yielding suspension D. D is dried at 100° C. overnight and transferred into a horizontal furnace, where it undergoes the following pyrolysis process: 6 h at 120° C.; 2 h at 300° C.; and finally 2 h at 900° C. The entire pyrolysis process is carried out under a dynamic vacuum of $10^{-4}$ MPa. The product of the pyrolysis process is the electrocatalyst labelled "$FeSn_{0.5}$—$CN_l$ 900/(Graphene/$SiO_2$)".

Example 5

Preparation of Graphene/$SiO_2$_KOH and Graphene/$SiO_2$_HF hierarchical Nanocomposites 200 mg of the Graphene/$SiO_2$ hierarchical nanocomposite obtained as described in example 2 are treated either:

1. in 50 mL of an aqueous 12 M KOH solution; or
2. in 50 mL of an aqueous 12 wt % HF solution.

Each treatment is carried out at room temperature under vigorous stirring. Each product is transferred into a different test tube, which undergoes centrifugation at 3000 rpm for 15 minutes; afterwards, the liquid phase is removed. Each resulting product is washed twice with bidistilled water and finally dried overnight at 100° C. Two samples are obtained: Graphene/$SiO_2$_KOH (which had undergone treatment with the aqueous 12 M KOH solution) and Graphene/$SiO_2$_HF (which had undergone treatment with the aqueous 12 wt % HF solution).

Example 6 (Comparative)

The hierarchical nanocomposites obtained in examples 1-4 undergo physicochemical characterization by means of: (i) high-resolution thermogravimetric analysis (HR-TGA); (ii) wide-angle x-ray diffraction (WAXD); (iii) confocal micro-Raman; and (iv) high-resolution transmission electron microscopy (HR-TEM). The performance of the hierarchical nanocomposites obtained in examples 1-4 in the oxygen reduction reaction (ORR) in the alkaline environment is also evaluated "ex-situ" by means of the "Cyclic Voltammetry with the Thin-Film Rotating Ring-Disk Electrode" (CV-TF-RRDE) method.

Figure 5:
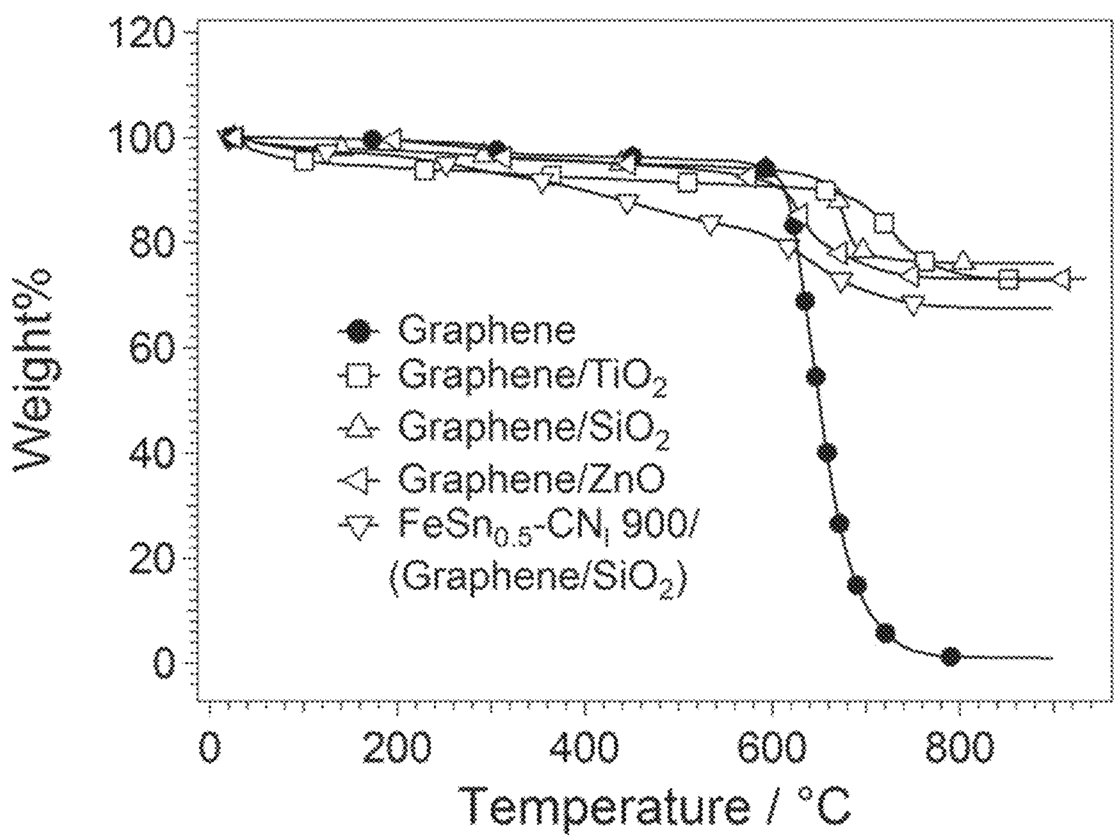
FIG. 5: HR-TGA profiles of the hierarchical nanocomposites obtained in examples 1-4.

The HR-TGA profiles of the hierarchical nanocomposites in an oxidizing atmosphere are shown in FIG. 5.

The graphene nanoplatelets (hereafter indicated as "Graphene" in the figures and in the tables) exhibit only one thermal degradation event at about 650° C. This event corresponds to oxidation of graphene nanoplatelets to $CO_2$. The Graphene/$TiO_2$, Graphene/$SiO_2$ and Graphene/ZnO hierarchical nanocomposites evidence a small mass loss between about 60° C. and about 650° C., which is ascribed to: (i) evaporation of the moisture adsorbed on the samples; and (ii) elimination of water upon condensation of neighboring —OH groups present on the surface of the hierarchical nanocomposites. Graphene/$TiO_2$, Graphene/$SiO_2$ and Graphene/ZnO exhibit one additional mass loss at about 750° C. and about 680° C., respectively. The mass loss is ascribed to the oxidation of graphene. The high-temperature residue in the HR-TGA profiles of Graphene/$TiO_2$, Graphene/$SiO_2$ and Graphene/ZnO is attributed to the mass of either $TiO_2$, $SiO_2$ or ZnO left after the decomposition of the graphene component. The HR-TGA profile of the $FeSn_{0.5}$—$CN_l$ 900/(Graphene/$SiO_2$) electrocatalyst shows two distinct mass loss events between 200° C. and 600° C. The former event is centered at T=300° C., is very broad and is assigned to the oxidation of the organic fraction of the electrocatalyst (the "shell") covering the Graphene/$SiO_2$ nanocomposite "core". The latter event, which is centered at T=640° C., is associated to the oxidative degradation of the graphene component of the "core". The high-temperature residue corresponds to the content of $SiO_2$, and Fe/Sn oxides left in the sample after the decomposition of all the organic moieties.

The degradation temperature of the graphene component of the Graphene/$TiO_2$ and Graphene/$SiO_2$ hierarchical nanocomposites is significantly higher in comparison with that of the pristine graphene nanoplatelets. This evidence is attributed to the establishment of interactions during the mechanical exfoliation step between the oxide carrier and the graphene, which lead to the stabilization of the latter component under oxidizing conditions. This phenomenon does not take place for—the $FeSn_{0.5}$—$CN_l$ 900/(Graphene/$SiO_2$) electrocatalyst; in the case of this system, it is expected that the stabilization effect arising from the interactions between the graphene and the $SiO_2$ carrier of the "core" is masked by the introduction of oxophilic Fe/Sn species, which promote the degradation of the organic moieties of the material.

Figure 6:
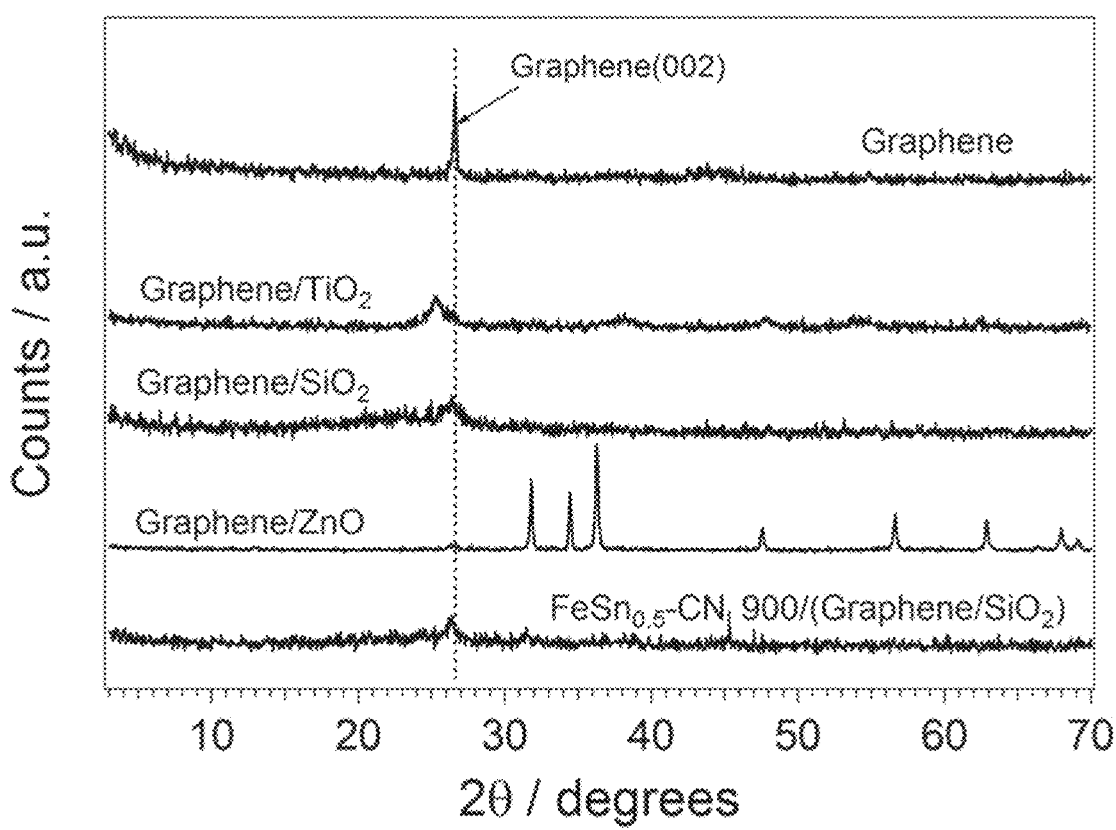
FIG. 6: WAXD profiles of the hierarchical nanocomposites obtained in examples 1-4.

The WAXD profiles of the hierarchical nanocomposites are shown in FIG. 6.

The WAXD profile of the pristine graphene nanoplatelets exhibits a well-developed, sharp peak at 2θ=26.6°, which is attributed to the residual stacking of the graphene layers. This result is rationalized considering that the nominal thickness of each nanoplatelet is on the order of 2-10 nm. Accordingly, on average each nanoplatelet consists of 6-30 stacked graphene layers. In all the hierarchical nanocomposite materials, the intensity of the WAXD peak at 2θ=26.6° is significantly reduced. This evidence is interpreted admitting that the mechanical exfoliation step triggers the exfoliation of the graphene layers in each nanoplatelet. Thus, in all the hierarchical nanocomposites the graphene component is mostly present as a single layer supported on the various carriers. The other peaks/features present in the WAXD profiles are easily attributed to the carrier included in the hierarchical nanocompsites, as detailed in table 1.

TABLE 1

Additional information on the WAXD patterns of the hierarchical nanocomposites

| Nanocomposite | Phase(s) yielding the peaks other than Graphene(002) | Information on the Phase(s) |
|---|---|---|
| Graphene/$TiO_2$ | $TiO_2$ (anatase) | $TiO_2$ (anatase): S.G. I 41/a m d, COD# 1010942[*] |
| Graphene/$SiO_2$ | $SiO_2$ (amorphous) | $SiO_2$ (amorphous) |
| Graphene/ZnO | ZnO | ZnO: S.G. P 63 m c, COD# 2300112[*] |
| $FeSn_{0.5}$—$CN_1$ 900/(Graphene/$SiO_2$) | $SiO_2$ (amorphous) | $SiO_2$ (amorphous) |

[*]Crystallography Open Database, http://www.crystallography.net/

Figure 7:
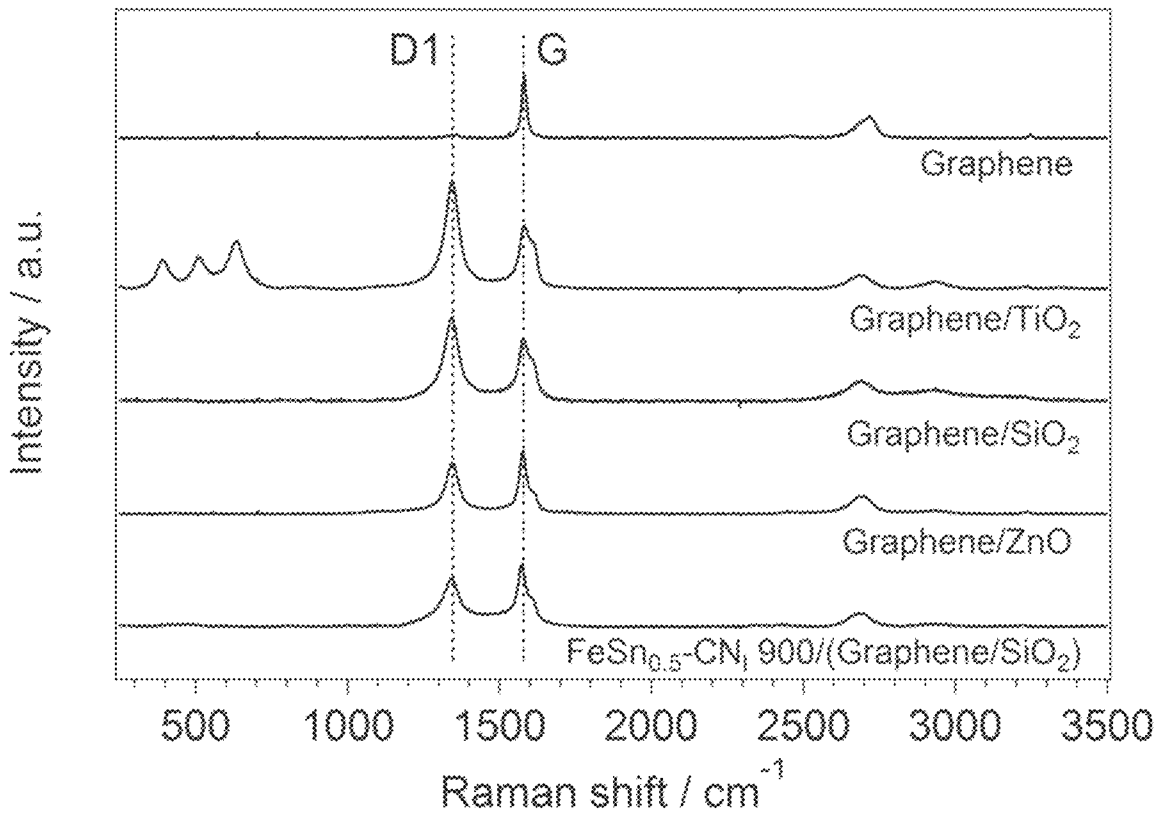
FIG. 7: Raman spectra of the hierarchical nanocomposites obtained in examples 1-4.

The Raman spectra of the nanocomposites obtained by a confocal micro-Raman instrumentation are depicted in FIG. 7.

The hierarchical nanocomposites exhibit two main groups of Raman bands. The former group of bands is evidenced at wavenumbers lower than 1000 $cm^{-1}$. These bands, which typically exhibit a low intensity, are associated to the carriers. The Graphene/$TiO_2$ hierarchical nanocomposite exhibits bands at 393, 510 and 635 $cm^{-1}$, which are typical of the anatase phase of $TiO_2$ in accordance with the following reference: Y. Djaoued, et al., J. Sol-Gel Sci. Technol. 24 (2002) 255-264. The latter group of bands, which is observed in all the hierarchical nanocomposites, is associated to graphene and comprises the intensities evidenced at about 1340, 1580 and 2690 $cm^{-1}$. In particular, the peaks at about 1340 and 1580 $cm^{-1}$ are attributed respectively to the D1 and G bands of graphene. The $I_{D1}/I_G$ ratio between the intensities of the D1 and G bands is reported in table 2.

TABLE 2

$I_{D1}/I_G$ ratio of the hierarchical nanocomposites

| Nanocomposite | $I_{D1}/I_G$ ratio |
|---|---|
| Graphene | 0.06 |
| Graphene/$TiO_2$ | 1.71 |
| Graphene/$SiO_2$ | 1.34 |
| $FeSn_{0.5}$—$CN_1$ 900/(Graphene/$SiO_2$) | 0.76 |
| Graphene/ZnO | 0.81 |

The $I_{D1}/I_G$ ratio is a figure of merit of the density of defects on graphene layers, in accordance with the following reference: L. M. Malard et al., Phys. Rep. 473 (2009) 51-87. In general, the higher the $I_{D1}/I_G$ ratio, the higher the density of defects on the graphene layers. Accordingly, the size of the ordered domains in the basal planes of graphene decreases as the $I_{D1}/I_G$ ratio rises. Table 2 clearly reveals that the mechanical exfoliation step increases significantly the $I_{D1}/I_G$ ratio of the starting graphene nanoplatelets. This evidence confirms that the hierarchical nanocomposites described in examples 1-4 of the present invention include graphene layers with a small lateral size, which are obtained by mechanical exfoliation and shredding of the starting graphene nanoplateles by the carrier particles. The latter play the role of “nano-grinders” during the mechanical exfoliation step. In the graphene layers included in the hierarchical nanocomposites, the ratio between the edge atoms (which exhibit a significant chemical reactivity) and the atoms embedded in the basal planes (which are very unreactive) is significantly larger in comparison with that of the starting graphene nanoplatelets. As a result, the mechanical exfoliation step “activates” the graphene layers included in the hierarchical nanocomposites.

Figure 8:
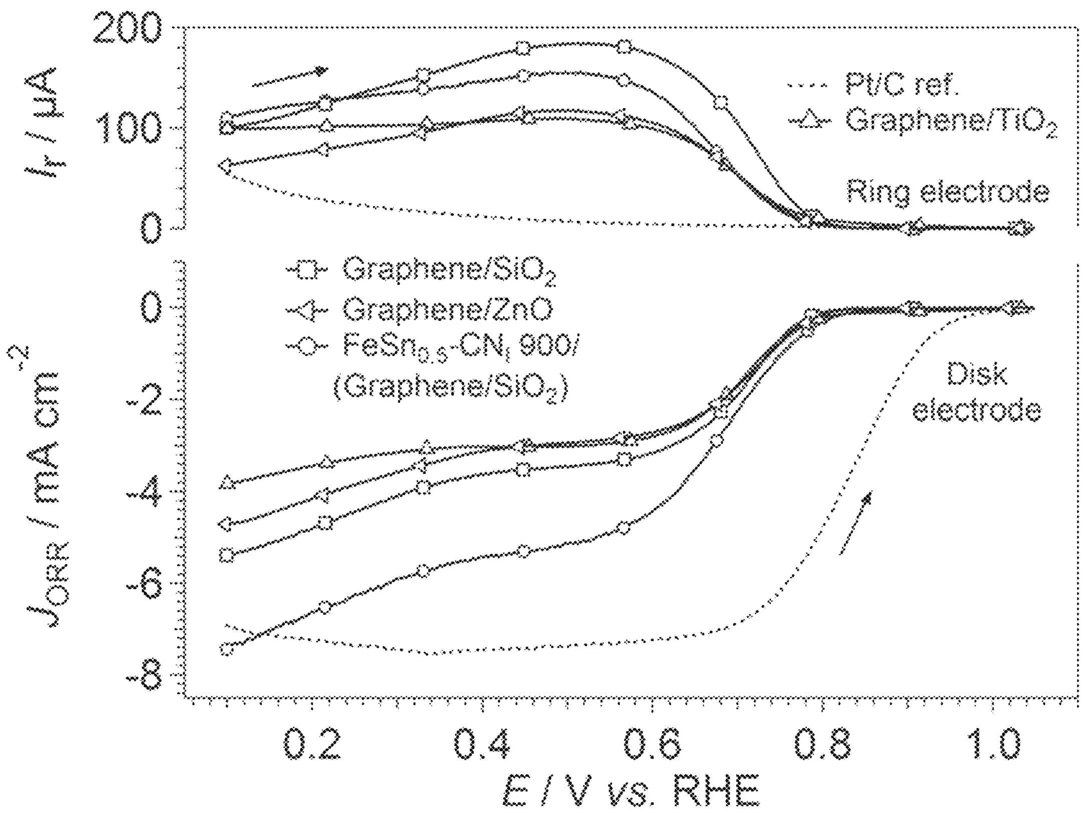
FIG. 8: CV-TF-RRDE positive-going profiles of the proposed hierarchical nanocomposites in the ORR. Experimental conditions: sweep rate=20 $mV \cdot sec^{-1}$; the RRDE is rotated at 1600 rpm; support electrolyte=0.1 M KOH; T=298 K.

The performance of the hierarchical nanocomposites in the ORR in an alkaline environment is evaluated by means of the CV-TF-RRDE method as described in the previous art. See for example: V. Di Noto et al., Fuel Cells 10 (2010) 234-244, herein incorporated by reference. The results are shown in FIG. 8.

The performance of the ECs in the ORR is gauged by comparing the respective “onset potentials”, defined as the potential where the electrocatalysts yield a faradic ORR disk current equal to 5% of the maximum ORR current determined on the Pt/C ref. at about 0.3 V vs. RHE. The onset potentials in the ORR of the hierarchical nanocomposites detailed in examples 1-4 are reported in table 3.

TABLE 3

Onset potential of the hierarchical nanocomposites

| Hierarchical nanocomposite | Onset potential/V vs. RHE |
|---|---|
| Graphene/$TiO_2$ | 0.778 |
| Graphene/$SiO_2$ | 0.769 |
| $FeSn_{0.5}$—$CN_1$ 900/(Graphene/$SiO_2$) | 0.795 |
| Graphene/ZnO | 0.779 |
| Pt/C reference | 0.946 |

The results evidence that all the proposed ECs exhibit a remarkable performance in the ORR. It is also revealed that, in comparison with the Pt/C reference, the hierarchical nanocomposites exhibit a lower selectivity in the 4-electron mechanism of the ORR, as witnessed by the larger ring currents. The following reference includes the complete justification of this statement: V. Di Noto et al., Fuel Cells 10 (2010) 234-244.

Figure 9:
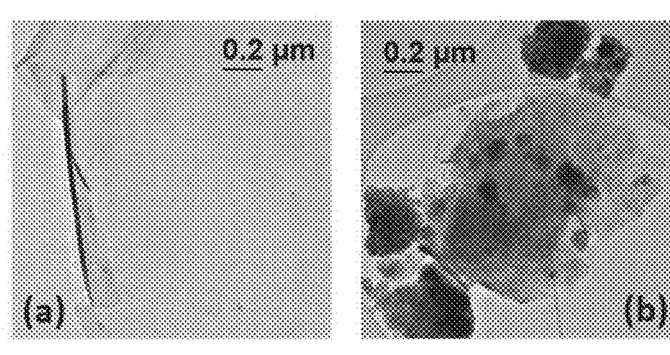
FIG. 9: Morphology of the hierarchical nanocomposites as determined by HR-TEM. Pristine graphene nanoplatelets (a); Graphene/$TiO_2$ (b); Graphene/$SiO_2$ (c).
Figure 9:
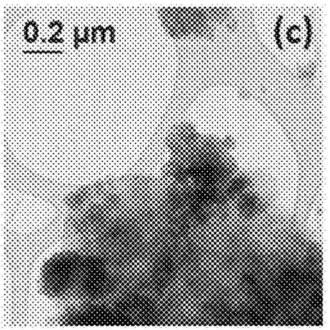

The morphology of the hierarchical nanocomposites as determined by HR-TEM is presented in FIG. 9.

Figure 10:
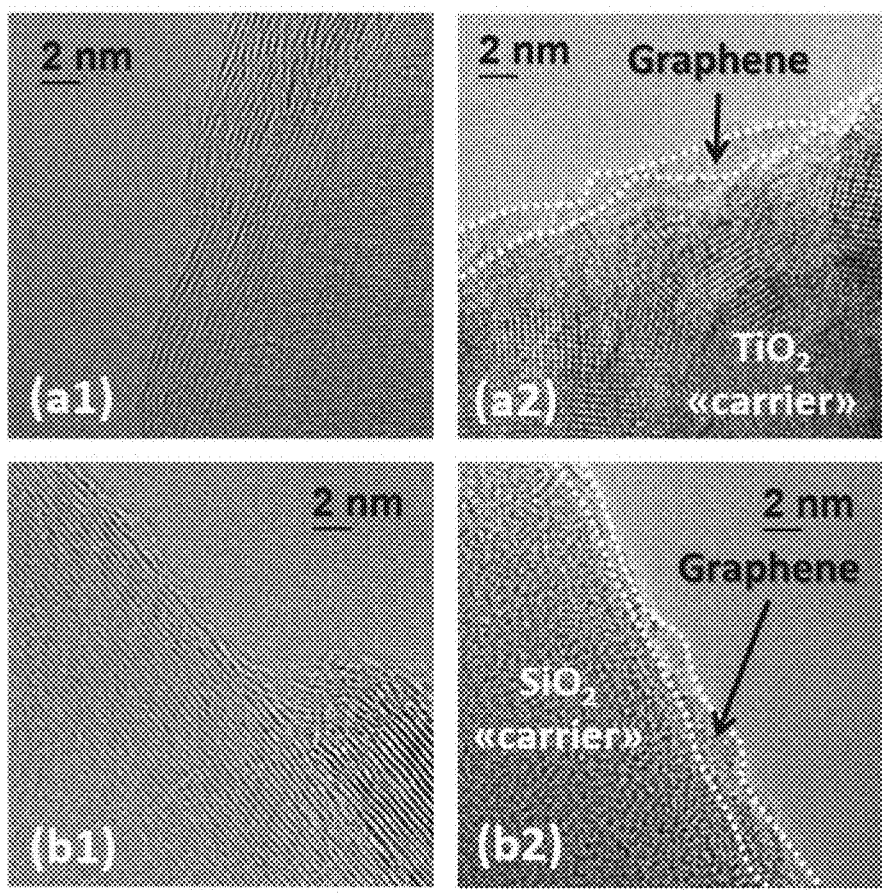
FIG. 10: HR-TEM micrographs of: Graphene/$TiO_2$ (a1 and a2); Graphene/$SiO_2$ (b1 and b2).

The HR-TEM micrographs clearly highlight that the mechanical exfoliation step strongly affects the morphology of the initial graphene nanoplatelets. In the hierarchical nanocomposites, the lateral size of the graphene component appearing as flakes is significantly reduced; furthermore, the graphene flakes and the carrier are thoroughly mixed. The details of the morphology of the hierarchical nanocomposites are exhibited in FIG. 10. The graphene flakes included in the hierarchical nanocomposites are characterized by rough edges, deriving from the grinding effect on the initial graphene nanoplatelets exerted by the carrier nanoparticles during the mechanical exfoliation step (see FIGS. 10(*a*1) and 10(*b*1)). FIGS. 10(*a*2) and 10(*b*2) also demonstrate that in the hierarchical nanocomposites the surface of the carrier nanoparticles is covered with a thin, subnanometric coating of graphene consisting of one/few monolayers. This evidence, which witnesses the intimate proximity between the graphene flakes and the carrier nanoparticles, also allows to rationalize and support the establishment of significant interactions between the different components of the hierarchical nanocomposites described in this invention.

Example 7

Preparation of Graphene/Ti Hierarchical Nanocomposite

Graphene nanoplatelets with a thickness of 2-10 nm are adopted as pFL; Ti nanoparticles (0=40-60 nm, 99.9 wt % Ti) are used as pCA. 3 g of Ti NPs are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final “Graphene/Ti” hierarchical nanocomposite.

Example 8

Preparation of Graphene/Fe Hierarchical Nanocomposite

Graphene nanoplatelets with a thickness of 2-10 nm are adopted as pFL; Fe nanoparticles (0=40-60 nm, 99.7 wt % Fe) are used as pCA. 3 g of Fe NPs are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final “Graphene/Fe” hierarchical nanocomposite.

Example 9

Preparation of Graphene/Ni Hierarchical Nanocomposite

Graphene nanoplatelets with a thickness of 2-10 nm are adopted as pFL; Ni nanoparticles (Ø=20 nm, 99.9 wt % Ni) are used as pCA. 3 g of Ni NPs are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/Ni" hierarchical nanocomposite.

Example 10

Preparation of Graphene/TiC Hierarchical Nanocomposite

Graphene nanoplatelets with a thickness of 2-10 nm are adopted as pFL; TiC nanoparticles (Ø=40 nm, 99 wt % TiC) are used as pCA. 3 g of TiC NPs are set inside a tungsten carbide grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/TiC" hierarchical nanocomposite.

Example 11

Preparation of Graphene/WC Hierarchical Nanocomposite

Graphene nanoplatelets with a thickness of 2-10 nm are adopted as pFL; TiC nanoparticles (Ø=80 nm, 99.95 wt % WC) are used as pCA. 3 g of WC NPs are set inside a tungsten carbide grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/WC" hierarchical nanocomposite.

Example 12

Preparation of Graphene/NaCl Hierarchical Nanocomposite

Graphene nanoplatelets with a thickness of 2-10 nm are adopted as pFL; NaCl powders (99 wt % NaCl) are used as pCA. 3 g of NaCl powders are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/NaCl" hierarchical nanocomposite.

Example 13

Preparation of Graphene/KBr Hierarchical Nanocomposite

Graphene nanoplatelets with a thickness of 2-10 nm are adopted as pFL; KBr powders (99 wt % KBr) are used as pCA. 3 g of KBr powders are set inside an agate grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/KBr" hierarchical nanocomposite.

Example 14

Preparation of Graphene/BN Nanocomposite

Graphene nanoplatelets with a thickness of 2-10 nm are adopted as pFL; BN nanopowders (0=100 nm, 99.5 wt % BN) are used as pCA. 3 g of BN NPs are set inside a tungsten carbide grinding jar together with 750 mg of the graphene nanoplatelets. The resulting precursor mixture is then ground for 15 hours at 500 rpm using a planetary ball mill; the direction of milling is reversed every hour. The product of this mechanical exfoliation step is the final "Graphene/BN" hierarchical nanocomposite.

Example 15

Graphene nanoplatelets with a thickness of 2-10 nm are adopted as pFL; $V_2O_5$ (Ø=+200 mesh, 99.6 wt %) are used as pCA. 5.42 g of $V_2O_5$ are set inside an agate grinding jar together with 0.136 g of the graphene nanoplatelets. The resulting precursor mixture is then ground for 10 minutes at 500 rpm using a planetary ball mill. The product of this mechanical exfoliation step is the final "Graphene/$V_2O_5$" hierarchical nanocomposite.

Figure 11:
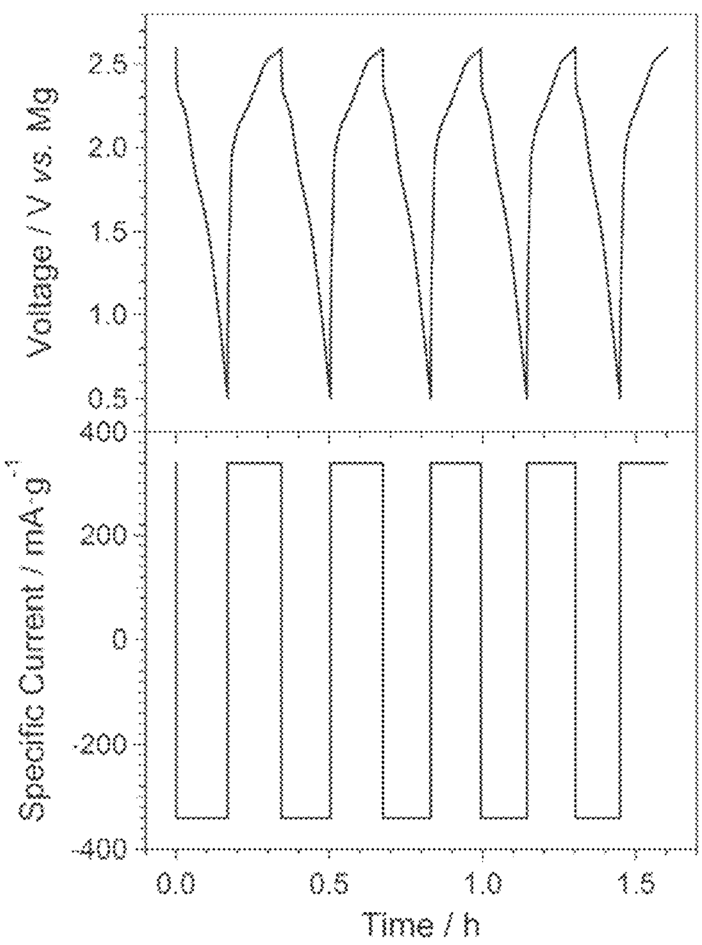
FIG. 11: Cycling performance of the Magnesium-ion secondary battery prototype mounting at the cathode the Graphene/$V_2O_5$ hierarchical nanocomposite.

The Graphene/$V_2O_5$ hierarchical nanocomposite is used to fabricate a magnesium-ion secondary battery prototype. 7.8 mg of polyvinylidene difluoride (hereafter labelled as "PVDF") are dissolved into 2 mL of N-methyl pyrrolidone (hereafter labelled as "NMP"). 99.7 mg of Graphene/$V_2O_5$ and 115.5 mg of SK6 carbon black are mixed together and progressively added into the solution; the resulting ink is homogenized by stirring for 12 h. This latter ink is deposited on a steel disk, Ø=19 mm; the solvent is removed by evaporation at 70° C. under vacuum for 12 h. The loading of Graphene/$V_2O_5$ on the steel disk is equal to 0.00044 g. The resulting system is used as the cathode of the magnesium-ion secondary battery prototype. This latter prototype also uses a Mg foil as the anode; the anode and the cathode electrodes sandwich a glass fiber separator with a thickness of 300 micrometers imbibed with the following electrolyte: $EMImCl/(AlCl_3)_{1.5}$ 98.00 wt %+$\delta MgCl_2$ 2.00 wt %. The details on the preparation of this electrolyte are reported in the previous art: F. Bertasi et al., ChemSusChem 8 (2015) 3069-3076. The battery is sealed by pressing anode, separator and cathode with a force of 4 tons. The battery is cycled twice at 34 $mA \cdot g^{-1}$ (the currents are normalized on the total mass of $V_2O_5$ present on the cathode) between 0.5 and 2.6 V vs. Mg. Afterwards, the battery is cycled at 340 $mA \cdot g^{-1}$ between 0.5 and 2.6 V vs. Mg. Results are shown in FIG. 11.

Example 16 (Comparative)

The cycling performance of the Magnesium-ion secondary battery prototype described in example 15 is compared with that of another Magnesium-ion secondary battery prototype described in the literature on F. Bertasi et al., ChemSusChem 8 (2015) 3069-3076. The two batteries incorporate the same functional materials; the only difference is that the cathode material used in the battery described in the literature does not include graphene. The performance of the two batteries is compared in table 4. The currents are normalized on the mass of $V_2O_5$ in the electrode.

TABLE 4

Comparison between the cycling performance of Magnesium-ion secondary batteries

| Battery | EXAMPLE 15 | F. Bertasi et al., ChemSusChem 8 (2015) 3069-3076 |
|---|---|---|
| Cathode material | Graphene/$V_2O_5$ | $V_2O_5$ |
| Rate of discharge/mA · $g^{-1}$ | 340 | 35 |
| Average discharge capacity/ mAh · $g^{-1}$ | 55 | 25 |

Even if at present the FL/CA hierarchical nanocomposites described here are believed to be the preferred embodiments of the present invention, those skilled in the art will realize that other and further embodiments can be made without departing from the spirit of the invention. Thus, all such further modifications and changes are included as come within the true scope of the claims set forth herein.

The invention claimed is:

1. A process for manufacturing core-shell hierarchical nanocomposites consisting of core carrier nanoparticles wrapped by a shell of layered materials, said process which comprises subjecting a mixture consisting of one or more of the layered materials and carrier particles to a mechanical exfoliation step, wherein said mechanical exfoliation step comprises milling said mixture, and wherein said mechanical exfoliation step is carried out in a grinding system comprising a closed vessel and mobile grinding objects which are made of one or more of steel, agate, zirconia and tungsten carbide;

wherein said milling is performed at a speed from 500 rpm to 700 rpm, wherein said layered materials are selected from graphene, graphene oxide, graphene nitride, and graphene functionalized with —COOH and/or —OH groups in the form of nanoplatelets, and said carrier nanoparticles are selected from:

(i) oxoclusters;

(ii) metal particles;

(iii) carbide particles; or (iv) nitride particles.

2. The process according to claim 1, characterized in said oxoclusters consist of one or more of Si, Ti, W, Ta, Zr, and Hf, said metal particles consist of one or more of Ni, Fe, Au, and Ag, said carbide particles consist of one or more of tungsten carbides, silicon carbide, titanium carbide, and boron carbide, and said nitride particles consist of one or more of boron nitride, silicon nitride, tungsten nitride, and titanium nitride.

3. The process according to claim 1, characterized in said carrier particles have a size ranging from 1 to 1000 nm.

4. The process according to claim 3, characterized in said carrier particles have a size ranging from 20 to 100 nm.

5. The process according to claim 1, characterized in said mechanical exfoliation step is performed at a temperature from −195 to +1200° C.

6. The process according to claim 5, characterized in said mechanical exfoliation step is performed at a temperature from −195 to +400° C.

7. The process according to claim 1, characterized in that said mechanical exfoliation step is performed at a pressure from $10^{-4}$ and 100 MPa.

8. The process according to claim 7, characterized in that said mechanical exfoliation step is performed at a pressure from 0.1 to 20 MPa.

9. The process according to claim 1, characterized in that the product of the mechanical exfoliation step is subjected to pyrolysis at a temperature from 100 to 1200° C.

10. The process according to claim 9, characterized in that said pyrolysis is carried out in one of the following:

under vacuum;

in an atmosphere of one or more inert gas;

in an atmosphere of one or more reactive gas; or in an atmosphere including one or more inert gas and one or more reactive gas.

11. The process according to claim 10, characterized in that said one or more inert gas is selected from the group consisting of He, Ar, Kr, Xe, $N_2$ and $CO_2$.

12. The process according to claim 10, characterized in that said one or more reactive gas is selected from the group consisting of $H_2$, $CH_4$, HCl, CO, $F_2$, $Cl_2$, and $O_2$ and vapors of one or more volatile organic compounds.

13. The process according to claim 9, characterized in that the product of the mechanical exfoliation step is subjected to pyrolysis at a temperature from 300 to 900° C.

14. The process according to claim 1, characterized in that said layered materials are is in the form of nanoplatelets.

15. The process according to claim 1, characterized in that the mobile grinding objects exhibit similar hardness property for achieving said mechanical exfoliation step.

* * * * *